(12) United States Patent
Monclova et al.

(10) Patent No.: US 9,094,152 B2
(45) Date of Patent: Jul. 28, 2015

(54) REROUTING T1 SIGNAL OVER A WIDE AREA NETWORK

(71) Applicants:VERIZON NEW YORK INC., New York, NY (US); VERIZON PATENT AND LICENSING INC., Basking Ridge, NJ (US)

(72) Inventors: Christopher J. Monclova, Bellerose, NY (US); Michael J. Baroz, Staten Island, NY (US)

(73) Assignees: Verizon Patent and Licensing Inc., Basking Ridge, NJ (US); Verizon New York Inc., New York, NY (US)

(*) Notice: Subject to any disclaimer, the term of this patent is extended or adjusted under 35 U.S.C. 154(b) by 217 days.

(21) Appl. No.: 13/671,364

(22) Filed: Nov. 7, 2012

(65) Prior Publication Data

US 2014/0126349 A1    May 8, 2014

(51) Int. Cl.
| | |
|---|---|
| *H04L 12/66* | (2006.01) |
| *H04L 1/00* | (2006.01) |
| *H04L 29/06* | (2006.01) |
| *H04J 3/06* | (2006.01) |
| *H04L 12/64* | (2006.01) |

(52) U.S. Cl.
CPC ............... *H04L 1/00* (2013.01); *H04J 3/0632* (2013.01); *H04L 69/16* (2013.01); *H04L 69/166* (2013.01); *H04L 69/168* (2013.01); *H04L 69/169* (2013.01); *H04L 12/6418* (2013.01)

(58) Field of Classification Search
CPC ......... H04L 12/26; H04L 12/24; H04L 12/46; H04L 69/16; H04L 69/166; H04L 69/168; H04L 69/169; H04J 1/16; H04J 1/16; H04J 3/0632
USPC ........................... 370/254–350; 709/201–213
See application file for complete search history.

(56) References Cited

U.S. PATENT DOCUMENTS

| | | | |
|---|---|---|---|
| 5,751,789 A | 5/1998 | Farris et al. | |
| 5,790,631 A | 8/1998 | Minarczik et al. | |
| 5,859,895 A | 1/1999 | Pomp et al. | |
| 6,002,502 A | 12/1999 | Pomp et al. | |
| 6,963,561 B1* | 11/2005 | Lahat | 370/356 |
| 7,983,670 B1 | 7/2011 | Elliott | |
| 8,437,278 B2* | 5/2013 | Ogata et al. | 370/254 |
| 8,725,123 B2* | 5/2014 | Raleigh et al. | 455/414.1 |
| 2004/0165533 A1* | 8/2004 | Izundu et al. | 370/241 |
| 2005/0068984 A1* | 3/2005 | Lee et al. | 370/485 |

* cited by examiner

*Primary Examiner* — Ayaz Sheikh
*Assistant Examiner* — Debebe Asefa

(57) ABSTRACT

The instant application describes a method and an apparatus for restoring T1 service in the event of a copper cable failure. The apparatus includes an interface configured to receive a T1 signal from a first customer device experiencing the copper cable failure; a converter configured to receive the T1 signal from the interface and place the T1 signal inside an IP packet routable over a wide area network; and a router configured to receive the IP packet from converter and send the IP packet over the wide area network to a central hub for conversion back into the T1 signal and delivery to a second customer device. The method requires equipment on one side of the T1 (e.g., at the location of the failure), and does not need knowledge of the customer's network addressing scheme. Solution is completely layer 2 and needs no input from the customer to re-establish service.

19 Claims, 4 Drawing Sheets

REROUTING T1 SIGNAL OVER A WIDE AREA NETWORK

BACKGROUND

The expressions service continuity, disaster recovery, risk management, and other IT business terms have become ingrained in efforts to provide the quality service to customers of a communication network provider. Yet the customers (e.g., those subscribing to Time-Division Multiplexing (TDM) services of the communication network provider), sometimes suffer the turmoil of an extended cable failure, or other debilitating network issue where service protection simply does not exist.

From the customer premise to the local Verizon wire center, T1 signals are designed to a copper aerial cable utilizing High-Speed Digital Subscriber Line (HDSL). The copper span may terminate into a 3-1 Distributed Control System (DCS) and is cross connected through one or more wire centers. This drop cable will then terminate to its far end location which, depending on the DS1 use, will be a collocation handoff, another customer premise, a switch or other point of termination that would accept a 1.544 mbps T1 signal. T1 lines, however, may be subject to trouble due to a failure somewhere on the copper span. The failure may last for a long time.

There are no truly diverse routes that prevent the cable failure from preventing service disruption on T1 lines. The drop cable may run underground from a pedestal to a network interface device. The pedestal may be a cable tower and may be located outside of a cable provider communication office. The network interface device may be a jack for receiving T1 cable and may be positioned on the wall of the customer's premises. The network interface device receives the cable from the pedestal and in turn connects the cable to the customer premises equipment (CPE) via the customer premises wiring.

Installations of the T1 service may be subject to occasional external (non-network-related) failures. For example, persons unaware of the route of an underground drop cable who are digging up the property for some reason may inadvertently cut the buried cable. Repair of damaged drop cables is labor intensive and expensive. If the mobile communication network provider has limited repair or installation technicians available, there will be times when the demand for their labor will result in work backlogs. At such times, it may take a week or more to repair a damaged drop cable. As a result, most T1 subscribers, who have come to expect ever-present ubiquitous service, quickly may become irate if the communication network provider does not restore the interrupted communication services quickly.

Furthermore, certain subscribers have special needs requiring guaranteed uninterrupted service. With such a special guaranteed service, the communication network provider may have guaranteed to repair any line faults within a specified short period of time and to supply the customer with alternate service until the repair is completed. To this end, the company may have to dispatch repair people quickly and may have to arrange delivery of the alternate service/solution.

From the above discussion it becomes apparent that a need exists to provide an effective efficient back-up to normal T1 communication services.

BRIEF DESCRIPTION OF THE DRAWINGS

The drawing figures depict one or more implementations in accord with the present teachings, by way of example only, not by way of limitation. In the figures, like reference numerals refer to the same or similar elements.

DETAILED DESCRIPTION

Figure 1A:
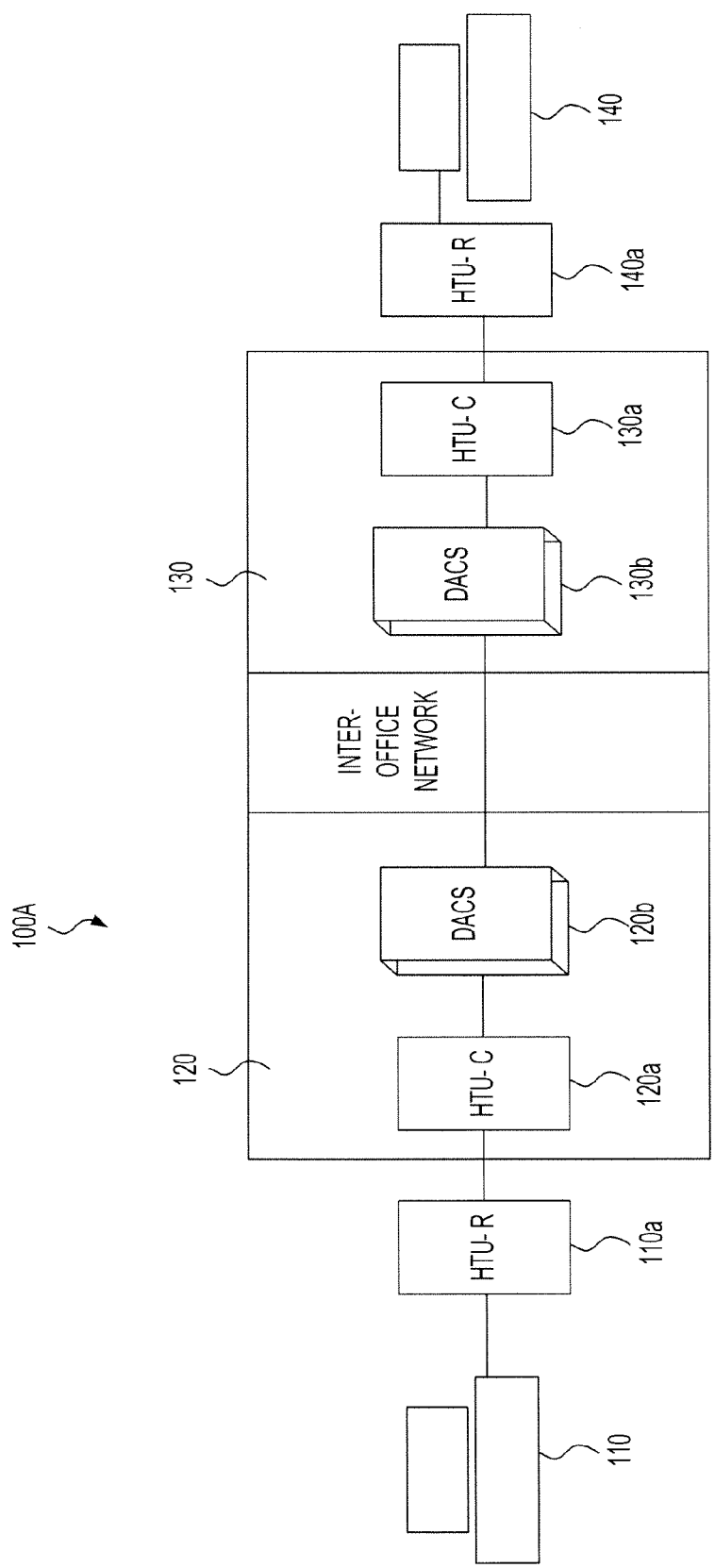
FIG. 1A illustrates a T1 system providing T1 service or other Time Division Multiplexing (TDM) services over a packet switched network.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

As a communication network provider (e.g., Verizon Wireless™) further delves into next generation packet switched services and/or cloud based services, there is a natural evolution taking place. The communication network provider and its customers are discovering more cost effective solutions that take advantage of packet switched technologies in order to provide desired bandwidth. Adhering to the aforementioned topics of service continuity and network convergence, this application describes a mobile technology, which provides a rapid response solution for temporary restoration of service where the T1 cable line experiences a protracted failure. The mobile technology (hereafter referred to as "suitcase") provides a detour for a T1 signal over a wide area network connection having a sufficiently high-speed/bandwidth (e.g., a 4G/Long Term Evolution (LTE) connection rather than a 3G connection). The T1 signal is reinserted into the core TDM network at a predetermined point, ultimately to be reunited with its normal route toward its destination. The suitcase can successfully restore T1 service, allowing the customers to promptly regain use of their end user applications in the following: (1) Internet access, (2) point-to-point private LAN (i.e., point of sale transaction processing or satellite connections to hub offices), (3) VoIP services, (4) combined VoIP and data, and (5) traditional multiplexed voice (i.e., PRI, DID and other TDM voice), allowing wholesale and enterprise circuits to be accommodated.

The remaining content of this document will elaborate on the technical details of the suitcase, including network topology in both the field and wire center access points. To provide context and in keeping with the example described in the background section, assume that a customer's T1 line goes down. For example, assume the customer has a satellite office that is connected to a main office via a T1 connection and that the customer is going to be down for an extended period of time, e.g., due to technicians being unavailable. The primary concern is to restore the customer's T1 service.

When the T1 connection is severed, the customer cannot access its private network on the main office. One solution is to allow a customer to utilize a point-to-point Virtual Private Network (VPN) across the Internet by equipping both the main office and the satellite office with a router. However, this solution requires that each of the main office and the satellite office be equipped with a router, even though the problem may simply exist at one end. This solution may be result in waste of resources and additional costs. For example, the office at which the problem causing the loss of service does not occur will nevertheless have to be equipped with a router to establish a VPN. To provide a one end solution, the instant application describes a system that includes a suitcase and a central office VPN hub. The suitcase can be deployed at the location at which the problem causing the loss of service occurs. In keeping with our previous example, the suitcase may be deployed at the satellite office experiencing a loss of T1 service. The central office VPN hub may be deployed in one of the central offices of the T1 provider and may be configured to be integrated into the Time Division Multiplexing network of the T1 service provider. This is described in more details with respect to FIG. 2. To this end, the central office VPN hub may be configured to connect to the central office, which is in turn connected to the main office of the customer.

The suitcase negotiates a point-to-point VPN with the central office VPN hub over a wide area network such as, for example, LTE network. The LTE (4G) and other wide area network services allow for an opportunity to deliver at least "best-effort" services. Using the suitcase and the central office VPN hub, the communication network provider can attempt to uphold T1 service across an Internet connection. The Internet may be inherently best-effort for some types of T1 transmission. In packet transmission, error correction may be taken care of at layer 3, the IP level. The packetized T1 signal may be sent across the Internet as UDP packets, a "best effort" delivery protocol. The UDP transmission may be used for video streaming and other time sensitive transmissions where fluidity of the signal is more important than occasional packet losses. The inherent nature of UDP transmission is to not resend lost or erred packets as the loss may be acceptable. In video, this loss may cause distortion in the digital picture or drop outs. The T1 signal may be time sensitive in nature, especially for voice. This is less of a problem for digital voice or data transmission as these are in packet form, and may be recovered by the customer's routers. In short, if digital packets are carried in the T1 signal and these packets are lost during transmission over the VPN link, the customer's routers may correct the errors. If analog data, such as voice, are transmitted over the T1 link, lost data in the VPN link may cause static and dropouts as there may be no mechanism for recovery of such lost data.

The customer may purchase T1 service for several reasons. These may include Internet access, point-to-point private LAN (e.g., credit card machines or satellite connections to main offices), VoIP services, VoIP with data services, and traditional (time-division) multiplexed voice services. The suitcase may be effectively used to provide services that are not severely affected by latency (e.g., delay in transmitting packets across the Internet). Therefore, data services, which are less sensitive to latency issues may have the best chance of success in transport over VPN, while traditional voice services may be most adversely affected by latency and therefore may have the least chance of success.

As noted above, in one implementation, the suitcase is configured to utilize 4G services as the medium to carry data in a customer's T1 connection. To this end, the suitcase may include a router configured to establish a VPN, over a 4G network, to the communication network provider's central office VPN hub. The router may include a Peplink Balance router. The Peplink Balance router may be configured to automatically register the suitcase with the 4G network (e.g., LTE network). To this end, the Peplink Balance router may include a dongle previously registered with the mobile communication network provider, thereby allowing access to the 4G network (e.g., LTE network). The suitcase may also include a T1 Ethernet converter such as the one made by Engage Inc. referred hereafter as the "IP-Tube" coupled to the router. The IP-Tube and the router may work together to send an encrypted, packetized T1 over the Internet. There is a mirrored set-up in the central office VPN hub that rebuilds the T1 signal from the received packets. This creates a point-to-point T1 pipe over the Internet, re-establishing temporary service.

In operation, a field technician can unplug the customer's equipment from the communication network provider's smart-jack and connect it to the suitcase, positioning it for optimal 4G service. Achieving strong 4G connectivity may be a prerequisite for operation of the suitcase. To achieve 4G connectivity, the system may use a USB dongle inserted inside the Peplink router or may utilize two cradlepoint vz-600-le (4G) routers, which use internal SIM cards and may be superior receivers to the USB dongles. An added benefit may be that these routers may provide information pertaining to the signal strength. The cradlepoint routers may be connected to the WAN ports on the Peplink router and may be external to the suitcase. This may allow placement of these routers remotely from the suitcase if the suitcase happens to be in a poor reception area such as, for example, a basement. The existing CATS infrastructure of a customer premise may be used to place these routers on another floor providing a better reception area. In addition to the use of these superior routers, a Wilson 600 4G antenna may be employed. Signal strength appears to work well above a level of −60 dbm. In this configuration, the Peplink router can bond two 4G routers through the WAN ports, increasing the speed of throughput and providing protection from 4G link failure.

If 4G service cannot be acquired, there may be an opportunity to provide service if the customer has an available broadband connection open to the Internet such as, for example, FIOS™. The network implementation rests in the central office VPN hub. The central office VPN hub may use a Peplink 380 router. In one example, the Peplink 380 router is connected to FIOS™ for business service, utilizing a static IP address. The Peplink 380 router may allow for up to twenty incoming suitcase connections. The Peplink 380 router may also provide a means for remote administration of all devices, including the IP tubes on the network, using a PPTP VPN server. Traffic can be monitored and adjustments can be made from existing Internet connections. The Peplink 380 router may be more robust than other similar routers, such as the 210 router, which may be used in the suitcase. The 210 router may make two VPN connections, and may be less expensive, making it a good choice for the suitcase. The Peplink 380 router according to specification may achieve twenty connections. There are routers that can accept more connections; however, they may overwhelm the bandwidth of the FIOS™ connection in the central office.

In the central office VPN hub, the IP tube equipment may be hardwired to Digital Cross-Connected (DACS) ports, allowing for a re-mapping of a customer's T1 connection through traditional TDM network to re-establish T1 service from the satellite office to the main office of the customer. A strong 4G signal may be important to ensure a low bit error rate on the T1 transmission. The addition of an amplified 4G antenna to the suitcase may help to alleviate reception issues in many situations.

Reference now is made in detail to the examples illustrated in the accompanying drawings and discussed below. FIG. 1A illustrates a T1 system 100A providing T1 service or other TDM services over a packet switched network. The T1 service or other TDM services are rooted in Circuit Emulation Services (CES). The CES was originally developed for providing voice transmission over a PSN. It offered a competitive alternative to true VoIP technology and a simpler handling process than VoIP's related protocols SIP. The CES also evolved into a method of providing cellular carriers the ability to utilize their 4G network infrastructure as a backhaul for existing 2G and 3G cell sites.

The system 100A includes a first customer device 110, a first central office center 120, and a second central office 130, and a second customer device 140. The T1 service may run through copper, twister pair cables connecting the first customer device 110 to the second customer device 140 through the first and second central offices 120 and 130. The first customer device 110 is connected to the HDSL Terminal Unit-Remote User (HTU-R) 110a for receiving the T1 service. The HTU-R 110a may be a jack for receiving T1 cable and may be positioned on the wall of the customer's premises housing the first customer device 110. The HTU-R 110a powers up through the HTU-C 120a at the central office 120. The HTU-R 110a may turn a high voltage T1 signal received from the HTU-C 120a to a low voltage T1 signal and pass it to the first customer device 110. Along the same lines, the HTU-R 110a may turn a low voltage T1 signal received from the first customer device 110 to a high voltage T1 signal and pass it to the HTU-C 120a.

The first central office 120 includes the HTU-C 120a and the DACS 120b. The HTU-C 120a may turn a high voltage T1 signal received from the HTU-R 110a to a low voltage T1 signal and pass it to the DACS 120b. Along the same lines, the HTU-C 120a may turn a low voltage T1 signal received from the DACS 120b to a high voltage T1 signal and pass it to the HTU-R 110a. The DACS 120b may allow for remote re-mapping of a customer's T1 through a traditional network. Specifically, the DACS 120b allows the communication service provider the opportunity to remotely reroute T1 signal from one destination to another.

The first central office 120 is connected to the second central office 130 through the inter office network. The second central office 130 also includes a DACS 130b and a HTU-C 130a. The DACS 130b and the HTU-C 130a are similar in functionality to the DACS 120b and the HTU-C 120a. Therefore, for the sake of brevity, the DACS 130b and the HTU-C 130a are not described here in more detail. The HTU-C 130a connects the second central office 130 to the HTU-R 140a. Similar to the HTU-R 110a, the HTU-R 140a may convert a high voltage T1 signal received from the HTU-C 130a to a low voltage T1 signal and pass it to the second customer device 140.

In keeping with the previous example, the first customer device 110 may be a computer located within a satellite office of a company A and the second customer device 140 may be a computer located within a main office of the company A. As shown, the first customer device 110 and the second customer device 140 are connected to each other via a T1 connection, such as a High-bit-rate digital subscriber line (HDSL). The HDSL was the first Digital Subscriber Line (DSL) technology to use a higher frequency spectrum of copper twisted pair cables and allows for a secure connection between the satellite office and the main office of the company. However, when the twisted pair cables experience failure, the secure connection between the satellite office and the main office on T1 may cease to exist and the customer may experience a long period until the T1 service is restored.

Figure 1B:
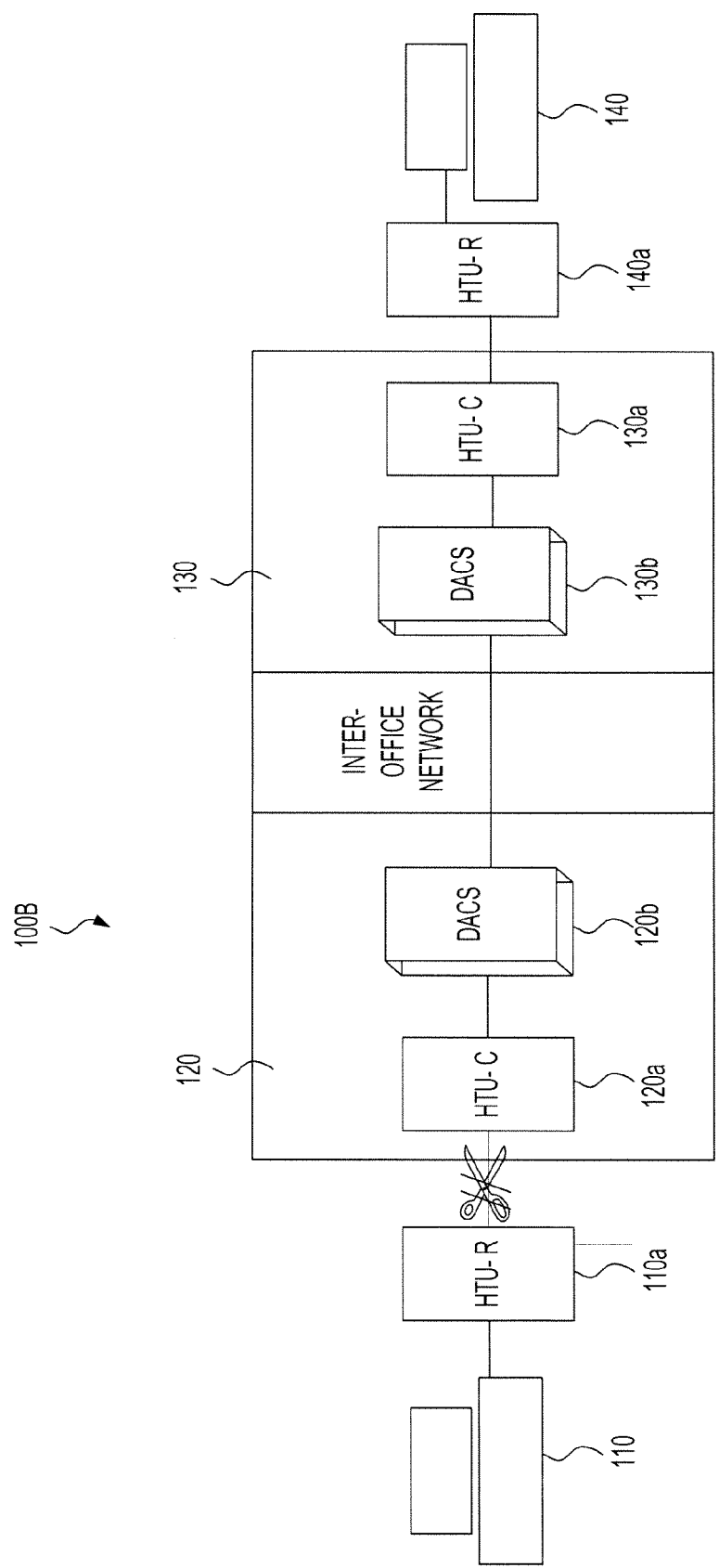
FIG. 1B illustrates a T1 system which is the same as the T1 system shown in FIG. 1A except with the T1 service being in trouble due to failure somewhere on the copper span.

FIG. 1B illustrates a T1 system 100B which is the same as the T1 system 100A except with the T1 service being in trouble due to failure somewhere on the copper span. In the T1 system 100B the T1 failure occurs between the customer premises (which houses the first customer device 110a and the HTU-R 110a) and the first central office 120. Specifically, the T1 failure occurs between the HTU-R 110a and the HTU-C 120a as shown by the cut copper line. This failure may be detected at the first central office 120 because the HTU-R 110a powers up via the HTU-C 120a. The HTU-C 120a may determine that T1 has experienced failure upon receiving an indication of loss of power connection with the HTU-R 110a.

The first customer device 110 may have another T1 connection from another service provider. However, this second T1 is also disabled because the location has access through one copper cable to both T1 services. As noted in the background section, there are no truly diverse routes that prevent the cable failure and thus service distribution of the T1 connection.

Figure 2:
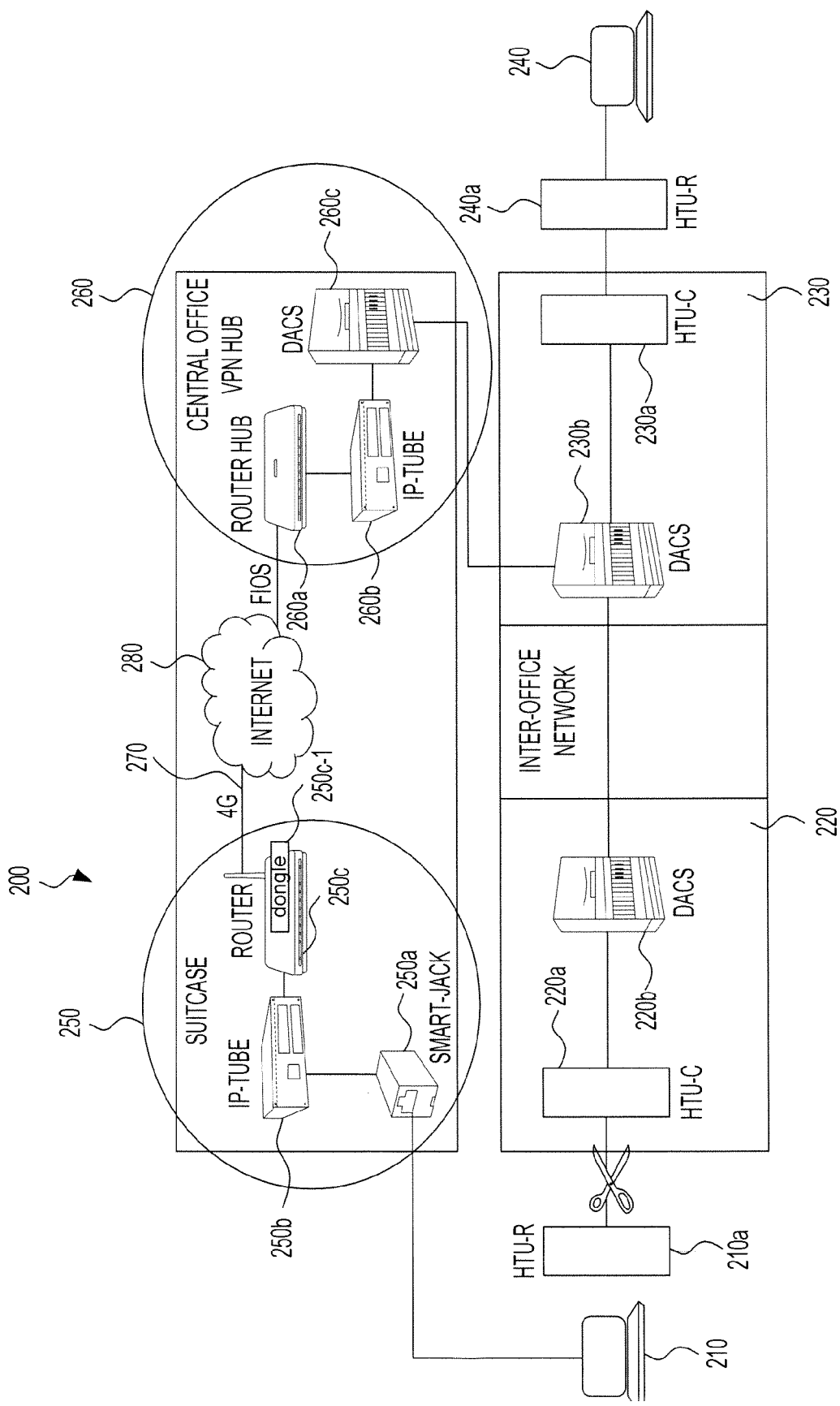
FIG. 2 illustrates an exemplary system including an exemplary portable suitcase capable of restoring T1 service to the customer in the T1 system shown in FIG. 1B.

FIG. 2 illustrates an exemplary system 200 including an exemplary portable suitcase capable of restoring T1 service to the customer in the system 100B shown in FIG. 1B. In one implementation, a portable suitcase means a handheld suitcase. The system 200 includes a first customer device 210, a first central office 220, a second central office 230, a second customer device 240, a portable suitcase 250, and a central office VPN hub 260. The first and second customer devices 210 and 240, the routers 210a and 240a, and the first and second central offices 220 and 230 are respectively similar to the first and second customer devices 110 and 140, the routers 110a and 140a, and the first and second central offices 120 and 130. Therefore, for the sake of brevity and clarity of description, they are not described in more detail.

In keeping with the previous example, the copper cable between router 210a and the router 220a may be broken. As a result, the customer may experience a lack of T1 service for an extended period of time. To address this, the system 200 includes the suitcase 250 and the central office VPN hub 260 connected to each other via the Internet 280. The suitcase 250 includes an interface 250a, an IP-Tube 250b, and a router 250c. The router 250c connects the suitcase 250 over a wide area network such as, for example, LTE 270 to the Internet 280 and ultimately to the central office VPN hub 260. In one specific example, the router 250c is connected to a mobile communication network provider dongle 250c-1, which has an account with the wide area network (e.g., LTE network) and automatically registers with the network and assigns an IP address (e.g., Dynamic Host Configuration Protocol (DCHP) IP address) to the router 250c, thereby connecting the suitcase 250 to the wide area network 270 and ultimately to the central office VPN hub 260. The central office VPN hub 260 includes a router 260a, an IP-Tube 260b, and a DASC 260c.

The suitcase 250 works in conjunction with the central office VPN hub 260 to restore T1 service at a failed end of the T1 service. To illustrate one specific example, upon failure of the T1 service at the customer premises (e.g., the satellite office) including the first customer device 210, the first customer device 210 is disconnected from the HTU-R 210a and connected to the interface 250a of the suitcase 250. The interface 250a may be a smart-jack interface. Once the suitcase 250 is powered ON, the T1 signal progresses from the first customer device 210 through the interface 250a to the IP-Tube 250b. The IP-Tube 250b may be an IPTube TDM over IP converter and may be manufactured by Engage Communications, Inc., for example. In the IP-Tube 250b CES packets are created and inserted into Ethernet frames. The Ethernet frames are also given IP header information and sent to a router 250c for transmission to the central office VPN hub 260. In one implementation, to create the IP packets for transmission over the Internet 280, the IP-Tube 250b buffers T1 frames and places the buffered T1 frames inside a payload of an IP packet. The IP packet includes a source address and the destination address. The source address is the IP address of the IP-Tube 250b and the destination address is the IP address of the IP-Tube 260b. The IP address of the IP-Tube 250b is on the same subnet as the IP address of the router 250c. Similarly, the IP address of the IP-Tube 260b is on the same subnet as the IP address of the router 260a. In a T1 signal, each frame may include 196 bits. The IP packets may include 24 to 48 T1 frames in one packet. In one specific example, the IP packet may include 32 T1 frames per IP packet. Once the IP packets are created, they are forwarded to the router 250c.

The router 250c may be a Peplink Balance router. The router 250c utilizes its dongle to send the IP packets containing the T1 signal over the networks 270, 280, and 290 to the central office VPN hub 260. Prior to sending the IP packets containing the T1 signal to the central office VPN hub 260, the router 250c and the router 260a may establish a VPN connection with each other. In one implementation, as described above, the router 250c includes a dynamic IP address assigned by the wide area network 270. The router 260a may have a static IP address assigned by the provider of the FIOS network 290, which is a broadband network connecting the central office VPN hub 260 to the Internet 280. The router 260a may be programmed with the static IP address, subnet mask, and the DNS address.

In order to keep the traffic secure and to provide LAN to LAN connectivity over the wide area network such as, for example, LTE 270, the routers 250c and 260a may be configured to communicate over a Virtual Private Network (VPN). This establishes a virtual point-to-point private LAN on which runs the rerouted T1 signal. The data on the VPN may be encrypted with a 256 Advanced Encryption Standard. To this end, both routers 250c and 260a may be aware of each other's serial number. The serial numbers may be pre-programmed into the routers 250c and 260c. Once the router 250c has network connectivity, it may start seeking the IP address of the router 260a and upon identifying the IP address of the router 260a may establish the point-to-point VPN connection with the router 260a. Once the VPN is established, the suitcase 250 and the central office VPN hub 260 communicate with each other as if they are sitting on the same Local Area Network (LAN). When dissimilar networks are bonded over a VPN connection, the associated routers may treat the devices as if they are on the same subnet. For example, network 192.168.0.1/24 on one end and network 192.168.2.1/24 on the other end of a VPN connection can communicate as if they are on the same subnet. This may be impossible without a VPN connection because these networks are dissimilar LANs, which may be normally shielded behind their associated WANs. Peplink routers establish the encrypted VPN connections by verifying each other's serial numbers, which may be pre-programmed into the routers. Peplink calls its VPN protocol to establish a VPN Speedfusion™

The central office VPN hub 260 acts as a hub for re-entry to the transport network. The central office VPN hub 260 is configured to have a similar setup to the suitcase 250. Specifically and as noted above, the central office VPN hub 260 includes the router 260a, the IP-Tube 260b, and the DACS 260c. In one implementation, the central office VPN hub 260 includes one IP-Tube 260b for each remote suitcase 250. In another implementation, the central office VPN hub 260 includes an IP-Tube 260b for multiple (e.g., four) remote suitcases 250. In this latter implementation, the IP-Tube 260b includes multiple (e.g., four) ports for receiving signals from multiple (e.g., four) different suitcases 250.

After arriving at the central office VPN hub router 260a, the Ethernet frames are sent to the IP-Tube 260b. The IP-Tube 260b reassembles the packets back into the T1 signal. Now, the payload of the T1 signal may be reinserted back into the original circuit within the transport network. Framing in T1 technology refers to a set of pattern of bits within the signal allowing the sending device and the receiving device to determine that T1 is working properly. Framing bits may be susceptible to errors in a packetized network and as such may cause T1 to fail. A failed T1 can take several seconds to recover, halting transmission. To avoid this, each IP-Tube 250b and 260b may locally hold the framing and only send the data portion of the T1 signals over the Internet. Locally holding the framing may mean each IP-Tube 250b and 260b may send the framing signals on their local T1 link to shield terminating T1 equipment from errors in transmission. Only the payload of the T1, and not the framing bits may be carried over the VPN.

Moving forward, the IP-Tube 260b reassembles the packets back into the T1 signal. This may be accomplished by connecting the IP-Tube 260b port to the DACS 260c. An interoffice route from the DACS 260a to a DACS port 230b located on the original T1 design is then found via a database. This establishes the connection back to the original route of the T1 signal. In another implementation, the terminating central office 230 is not connected directly to the DACS 260c of the central office VPN hub 260. In this scenario, the database may be utilized to identify intermediary DACS which can connect to both the central office VPN hub 260 and the end central office 230. Upon identification of such intermediary DACS, the DACS 260c is programmed to route the packet to the intermediary DACS. The intermediary DACS is also programmed to route the packet to the end central office 230 for delivery to the second customer device 240.

In operation, a technician is dispatched with the required equipment to route the customer signal over the LTE network. An adequate 4G signal with sustainable throughput of 2 mbps or higher and latency of less than 100 ms may be required to maintain adequate service to the customer equipment. Using the suitcase may be inherently more prone to erred transmission than a true T1 due to 4G signals, dropouts, latency, and lost packets. Adequate service may refer to a level of service where the customer can function although transmission may seem slower. A circuit may be inadequate when the inherent errors overwhelm the connection and render it unusable or the slow speed frustrates the customer. The suitcase deployment is successful and is advantageous to customers as compared to the alternative—no service for failed T1 cable.

The suitcase 250 is powered by a single connection to a customer supplied 120 Volt AC receptacle. Cooling may be provided via DC fans located in the case. The field equipment may also include an external 4G antenna and a corresponding 4G amplifier/repeater. The base 4G signal for the given location can be maximized to ensure a signal that will maintain the throughput and latency required to pass the T1 traffic over 4G network.

The TS1 port on the IP-Tube 250b in the suitcase 250 is connected to the first customer device 210 once the smart jack of the first customer device 210 has been disconnected from the circuit 210a and connected to the suitcase 250. The field technician may give the go ahead to have necessary digital cross connections made to engage the temporary route. For example, as noted above, if the terminating central office (e.g., the second central office 230) is not connected directly to the DACS 260c of the central office VPN hub 260, the technician may give the go ahead to the network operator to identify an intermediately DACS which can connect to both the central office VPN hub 260 and the terminating central office (e.g., the second central office 230). Upon identification of such intermediary DACS, the DACS 260c is programmed to route the packet to the intermediary DACS. The intermediary DACS is also programmed to route the packet to the second central office 230 for delivery to the second customer device 240. The IP-Tubes may also be provisioned in both the suitcase and the central office hub to set destination IP addresses. The hub IP-tube destination may be set to the suitcase's local IP-address and the Suitcase's IP-Tube's destination address may be set to the appropriate Hub-side IP-tube local address. Standard T1 tests may not be performed in all instances to verify the T1 status. Alteration of how the framing is transported, as well as the use of alternate protocols between the IP-tubes may render traditional testing impossible. HDLC protocols for instance extract "Cisco packets" from the T1 and pass these packets over the VPN instead of attempting to transmit every bit in the T1 signal. This method may provide connectivity at a much lower bandwidth. Testing is best performed at the packet or layer-3 level. The field technician may also verify with the customer representative that their service is operational. The controlling maintenance organization (MCO) may also be notified that the customer is on a bypass and should not normalize digital cross connections until the problem has been fixed and are ready to throw the circuit back to its normal condition. The T1 service over the wireless link may not be 100% as efficient as the T1 service over the copper line. However, the T1 service over the wireless link may provide a high level of connectivity where there is normally no alternative. Packet errors that may occur on the T1 service over the wireless link may be corrected by the customer's equipment at layer-3, as is normal for lost packets over an Ethernet connection.

As shown by the above discussion, functions relating to rerouting T1 signal over a wide area network, via a graphical user interface of a mobile station may be implemented on computers connected for data communication via the components of a packet data network, operating as a suitcase and a central office VPN hub as shown in FIG. 2. Although special purpose devices may be used, such devices also may be implemented using one or more hardware platforms intended to represent a general class of data processing device commonly used to run "server" programming so as to implement the rerouting of T1 signal over the wide area network functions discussed above, albeit with an appropriate network connection for data communication.

As known in the data processing and communications arts, a general-purpose computer typically comprises a central processor or other processing device, an internal communication bus, various types of memory or storage media (RAM, ROM, EEPROM, cache memory, disk drives etc.) for code and data storage, and one or more network interface cards or ports for communication purposes. The software functionalities involve programming, including executable code as well as associated stored data, e.g., files used for rerouting T1 traffic from the customer device over the wide area network. The software code is executable by the general-purpose computer that functions as the suitcase and/or that functions as the central office VPN hub. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for rerouting T1 traffic over a wide area network in essentially the manner performed in the implementations discussed and illustrated herein.

Figure 3:
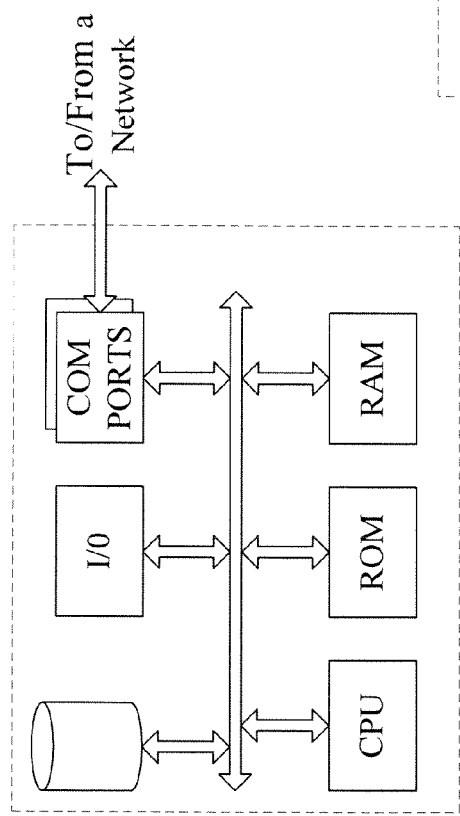
FIG. 3 is a simplified functional block diagram of a computer that may be configured as a host or server, for example, to function as the central office VPN hub in the system of FIG. 2.
Figure 4:
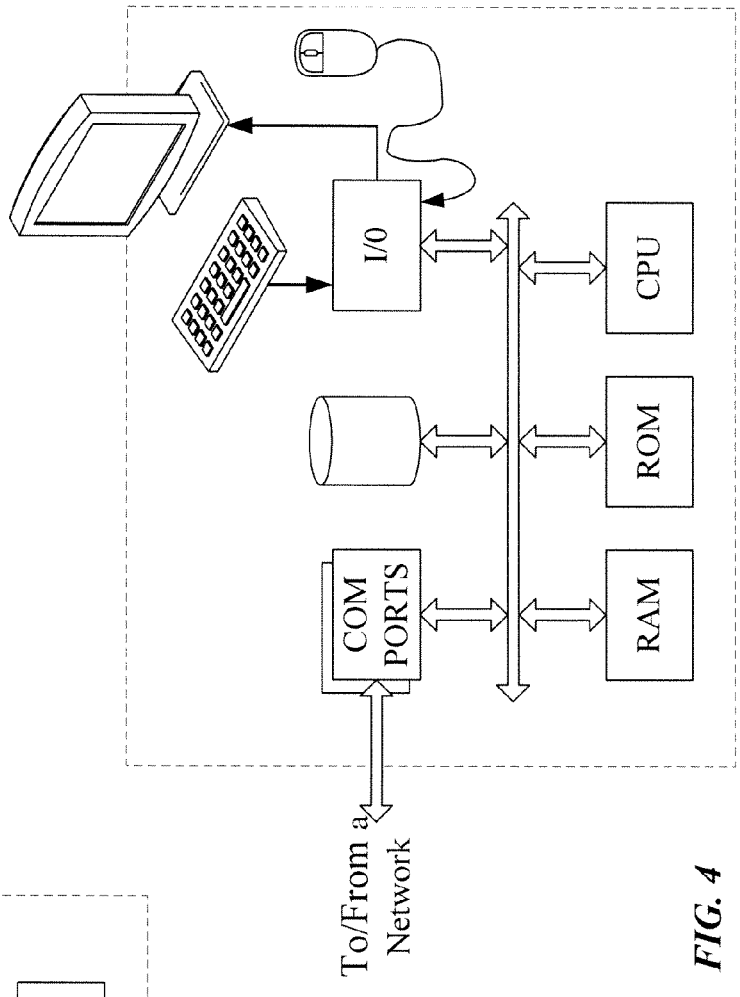
FIG. 4 is a simplified functional block diagram of a personal computer or other work station or terminal device.

FIGS. 3 and 4 provide functional block diagram illustrations of general purpose computer hardware platforms. FIG. 3 illustrates a network or host computer platform, as may typically be used to implement a server. FIG. 4 depicts a computer with user interface elements, as may be used to implement a personal computer or other type of work station or terminal device, although the computer of FIG. 4 may also act as a server if appropriately programmed. It is believed that those skilled in the art are familiar with the structure, programming and general operation of such computer equipment and as a result the drawings should be self-explanatory.

A server, for example, includes a data communication interface for packet data communication. The server also includes a central processing unit (CPU), in the form of one or more processors, for executing program instructions. The server platform typically includes an internal communication bus, program storage and data storage for various data files to be processed and/or communicated by the server, although the server often receives programming and data via network communications. The hardware elements, operating systems and programming languages of such servers are conventional in nature, and it is presumed that those skilled in the art are adequately familiar therewith. Of course, the server functions may be implemented in a distributed fashion on a number of similar platforms, to distribute the processing load.

A computer type user terminal device, such as a PC or tablet computer, similarly includes a data communication interface CPU, main memory and one or more mass storage devices for storing user data and the various executable programs (see FIG. 6). A mobile device type user terminal may include similar elements, but will typically use smaller components that also require less power, to facilitate implementation in a portable form factor. The various types of user terminal devices will also include various user input and output elements. A computer, for example, may include a keyboard and a cursor control/selection device such as a mouse, trackball, joystick or touchpad; and a display for visual outputs. A microphone and speaker enable audio input and output. Some smartphones include similar but smaller input and output elements. Tablets and other types of smartphones utilize touch sensitive display screens, instead of separate keyboard and cursor control elements. The hardware elements, operating systems and programming languages of such user terminal devices also are conventional in nature, and it is presumed that those skilled in the art are adequately familiar therewith.

Hence, aspects of the methods of rerouting T1 traffic over the wide area network outlined above may be embodied in programming. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of the wide area network provider (e.g., LTE network provider) and/or the broadband provider (e.g., FIOS provider) into the computer platform of the suitcase and/or the central office VPN hub. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer (s) or the like, such as may be used to implement the functionalities relating to the rerouting T1 traffic via a wide area network shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. An apparatus comprising: an interface configured to receive a T1 signal from a first customer device experiencing a physical line T1 service failure; a converter configured to: receive the T1 signal from the interface; and place the T1 signal inside IP packets routable over a 4G Long Term Evolution network provided by a mobile communication network provider; a mobile communication network provider dongle configured to: automatically register with the 4G Long Term Evolution network based on an account associated with the mobile communication network provider dongle; and in response to the registering, receive from the 4G Long Term Evolution network an IP address in the 4G Long Term Evolution network; a router connected to the mobile communication network provider dongle, the router configured to: receive the IP address provided by the 4G Long Term Evolution network from the dongle; receive the IP packets from converter; and using the mobile communication network provider dongle, send the IP packets over the 4G Long Term Evolution network to a central hub for conversion into the T1 signal for delivery to a second customer device, wherein the IP packet includes the IP address received from the dongle;

and a portable housing configured to include the interface, the converter, the mobile communication network provider dongle and the router.

2. The apparatus of claim 1, wherein the interface is configured to receive the T1 signal over a physical connection from the first customer device.

3. The apparatus of claim 1, wherein the interface includes a smart-jack interface.

4. The apparatus of claim 1, wherein the converter includes an IP-Tube Time Division Multiplexing-over-IP converter.

5. The apparatus of claim 1, wherein the IP packets includes a source address identifying an IP address of the converter and a destination address identifying an IP address associated with a central hub.

6. The apparatus of claim 1, wherein the converter is configured to place 24 to 48 frames of a T1 signal inside the IP packets for delivery over the 4G Long Term Evolution network.

7. The apparatus of claim 1, wherein the converter is configured to locally control signals identifying errors in T1 transmission and is further configured to only place a data portion of the T1 signal inside the IP packets.

8. The apparatus of claim 1, wherein the router is configured to establish a point-to-point Virtual Private Network (VPN) connection with the central hub.

9. A central hub comprising: a router configured to: establish a virtual private network connection over a 4G Long Term Evolution network with an apparatus at a customer location; receive, over a 4G Long Term Evolution network at the virtual network connection, IP packets containing only a data portion of a T1 signal of a first customer device experiencing a physical line T1 service failure; a converter, connected to the router, configured to: receive the IP packets from the router; extract from the IP packets the data portion of the T1 signal; and reassemble the T1 signal using locally stored T1 framing signals and the extracted data portion of the T1 signal; and an interface connected to the converter, configured to: receive the reassembled T1 signal from the converter; and direct the reassembled T1 signal to a central office for transmission of the T1 signal over a physical line to a second customer device.

10. The central hub of claim 9, wherein the router includes a Peplink 380 router having a broadband connectivity to Internet.

11. The central hub of claim 9, wherein the router includes a static IP address.

12. The central hub of claim 9, wherein the converter includes an IP-Tube Time Division Multiplexing over IP converter.

13. The central hub of claim 9, wherein the converter is configured to locally control signals identifying errors in T1 transmission.

14. The central hub of clam 9, wherein the interface includes a Digital Cross-Connected interface configured to re-map the T1 signal of the first customer device to a central office for delivery to the second customer device.

15. A system comprising: a portable apparatus including: an interface configured to receive a T1 signal from a first customer device; a converter configured to receive the T1 signal from the interface and place the T1 signal inside IP packets routable over a 4G Long Term Evolution network; a mobile communication network provider dongle configured to: automatically register with the 4G Long Term Evolution network based on an account with the mobile communication network provider associated with the mobile communication network provider dongle; and in response to the registering, receive an IP address in the 4G Long Term Evolution network, wherein the received IP address is associated with the portable apparatus; a router connected to the mobile communication network provider dongle, the router configured to: receive the IP address from the dongle; receive the IP packets from converter; and send, via the mobile communication network provider dongle, the IP packets over the 4G Long Term Evolution network to a central hub for conversion into the T1 signal and delivery to a second customer device; and a central hub including: a router configured to receive, over the 4G Long Term Evolution network, the sent IP packets containing the T1 signal of the first customer device; a converter configured to receive the IP packets from the central hub router and extract from the IP packets the T1 signal; and an interface configured to receive the T1 signal from the central hub converter and direct the T1 signal to a central office for transmission of the T1 signal over a physical line to the second customer device.

16. A method comprising: receiving, at a portable device, a T1 signal from a first customer device experiencing a physical line T1 service failure; automatically, by a mobile communication network provider dongle connected to a router included with the portable device, registering with a 4G Long Term Evolution network based on an account associated with the mobile communication network provider dongle; in response to the registering, receiving via the mobile communication network provider dongle an IP address in the 4G Long Term Evolution network; establishing a wireless link using the mobile communication network provider dongle between the portable device and a central hub through the 4G Long Term Evolution network; converting the received T1 signal into IP packets routable over the wireless link; and routing the IP packets via the mobile communication network provider dongle over the wireless link to the central hub for conversion back into the T1 signal and for delivery to a second customer device, wherein the wireless link includes substantially a same throughput as a physical connection providing the T1 service to the first customer device.

17. The method of claim 16, wherein the IP packets include a source address identifying an IP address associated with the portable device and a destination address identifying an IP address associated with the central hub.

18. The method of claim 16, wherein converting the received T1 signal into the IP packets includes placing 24 to 48 frames of the T1 signal inside IP packets for delivery over the wireless link.

19. The method of claim 16, further comprising: receiving, at the central hub and over the wireless link, the IP packets containing the T1 signal of the first customer device; converting the IP packets back to the T1 signal; and routing the converted T1 signal to a central office for transmission of the T1 signal over a physical line to the second customer device.

* * * * *